US008713045B2

(12) United States Patent
Bouchard et al.

(10) Patent No.: US 8,713,045 B2
(45) Date of Patent: Apr. 29, 2014

(54) LOCATION-TYPE TAGGING USING COLLECTED TRAVELER DATA

(75) Inventors: Guillaume M. Bouchard, Saint-Martin-le-Vinoux (FR); Luis Rafael Ulloa Paredes, Meylan (FR); Victor Ciriza, Saint Martin d'Uriage (FR); Lionel Cazenave, Grenoble (FR); Pascal Valobra, Meylan (FR)

(73) Assignee: Xerox Corporation, Norwalk, CT (US)

( * ) Notice: Subject to any disclaimer, the term of this patent is extended or adjusted under 35 U.S.C. 154(b) by 75 days.

(21) Appl. No.: 13/351,560

(22) Filed: Jan. 17, 2012

(65) Prior Publication Data
US 2013/0185324 A1 Jul. 18, 2013

(51) Int. Cl.
*G06F 7/00* (2006.01)
*G06F 17/30* (2006.01)

(52) U.S. Cl.
USPC .......................................... 707/769; 707/770

(58) Field of Classification Search
USPC ......... 707/706, 736, 737, 724, 729, 769, 770; 709/223, 221
See application file for complete search history.

(56) References Cited

U.S. PATENT DOCUMENTS

| 7,792,273 | B2 * | 9/2010 | Fano et al. ............... | 379/265.02 |
| 8,095,303 | B1 * | 1/2012 | Nesbitt et al. .............. | 701/426 |
| 2006/0293046 | A1 * | 12/2006 | Smith ......................... | 455/423 |
| 2008/0109153 | A1 * | 5/2008 | Gueziec ..................... | 701/117 |
| 2008/0168164 | A1 * | 7/2008 | Arseneau .................... | 709/223 |
| 2009/0295582 | A1 * | 12/2009 | Sawyer ....................... | 340/572.1 |

OTHER PUBLICATIONS

Joshua Brustein, "Projects Use Phone Data to Track Public Services," The New York Times, Jun. 5, 2011.

Carlos Canudas De Wit, "ITC in Intelligent Transportation Systems: Real-Time Traffic Forecasting and Control," Rencontres INRIA INDUSTRIE, Jun. 21, 2010.
Ray Renner, Zohra Hemani, George Tjoumas, Kimberly Turley, Craig Callender, Becky Elstad and Paul Smith, "GeoProfiling, A Services-Oriented Approach," Northrop Grumman, Chantilly, VA, USA—17th International Conference on Geoinformatics, 2009.
Camille Roth, Soong Moon Kang, Michael Batty and Mark Barthelemy, "Commuting in a Polycentric City," pp. 1-9, Jan. 2010.
Andrea De Montis, Marc Barthelemy, Alessandro Chessa and Alessandro Vespignani, "The Structure of Inter-Urban Traffic: A Weighted Network Analysis," pp. 1-12, Jul. 2005.
Javier Gutierrez and Juan Carlos Garcia-Palomares, "New Spatial Patterns of Mobility Within the Metropolitan Area of Madrid: Towards More Complex and Dispersed Flow Networks," Journal of Transport Geography, vol. 15, (2007) pp. 18-30, 2006 Published by Elsevier Ltd.

* cited by examiner

*Primary Examiner* — Md. I Uddin
(74) *Attorney, Agent, or Firm* — Fay Sharpe LLP (57) ABSTRACT

A method and system are disclosed for automatically tagging locations using collected traveler information. Traveler information, including a time/date stamp and a unique identification associated with the traveler are collected and stored in a database with locations corresponding to transportation stops. A location query, which includes a location type, an analysis period, optionally, an analysis approach, and a user selected threshold are received and a number of time/location stamps for each location is determined based upon an interval associated with the selected type. The maximum number of time/location stamps for that location is determined, and using the selected threshold, a minimum number of stamps required to designate a location as the selected type is determined. When the number of time/location stamps within the time interval for the selected type is greater than or equal to the minimum number calculated, the location is tagged as the selected location type.

21 Claims, 7 Drawing Sheets

LOCATION-TYPE TAGGING USING COLLECTED TRAVELER DATA

BACKGROUND

The following relates to the data processing arts, data analysis, tracking arts, and so forth.

Cities change rapidly and in ways that are currently not sufficiently predictable, which presents substantial difficulties to public authorities when responding to the needs of their citizens. Accordingly, urban planning aims at establishing policies and organizing cities from a medium to long term point of view. Parts of a city or locations that once were used for industrial or agricultural purposes can become appropriated for residential use and cause shifts in the use of public transportation systems. However, such a change in usage may take a substantial period of time before becoming known to the public transportation system. Nowadays, tagging, i.e., identifying, location type (e.g., "Home" or "Work") is usually obtained by surveys or simply obtained by experts of the transportation agencies who establish by "common knowledge," routing and stop placements for the system. Surveys take a long time to be performed over the whole city and cannot be updated frequently. These methods lack accuracy, furthermore such tagging needs to be validated and followed over time, a necessarily time and labor intensive endeavor.

In the case of a public transportation network, cities store huge quantities of data about a traveler's schedule and location based upon ticketing, but do not use the collected information in order to understand better the usage of the transportation network and more specifically to detect the purpose of travel, i.e., identify the type of location at the traveler's destination. Other attempts to update tagging of location type include surveys (census data), architectural or type of building data, business registry, satellite or on street imagery. Such attempts involve manual input or manipulation of data. Additionally, the usage of such data may provide an indication of what the location could be, but fails to take into account what the location actually is used for, e.g., a former factory that has been converted to loft apartments, a former residence which is now used as a hotel or place of business, etc.

BRIEF DESCRIPTION

In one aspect of the exemplary embodiment, a method for tagging a location type includes collecting, with a computer processor, traveler information that includes at least one of a unique traveler identification and at least one stamp representative of at least one of a time and an associated location into an associated database. The method also includes receiving a location query that includes a selected location type (LType), an analysis period (AP), and a selected threshold acceptance ($Th_{pt}$), and determining, for each of a plurality of locations, a quantity (n) of stamps within a time interval corresponding to the selected location type (LType). In addition, the method includes determining, for each of the plurality of locations, a total number of stamps (T) during the analysis period (AP), and computing, for each of the plurality of locations, a minimum quantity of stamps (H) to indicate the location is the selected location type (LType) as a function of the selected threshold acceptance ($Th_{pt}$) and the total number of stamps (T) during the analysis period (AP). The method also includes tagging each of the plurality of locations in accordance with the selected location type (LType) when the quantity of stamps (n) within the time interval corresponding to the selected location type and the minimum quantity of stamps (H) to indicate the location is the selected location type.

In another aspect, a system for tagging a location type that includes a processor with access to associated memory, the associated memory storing an associated database that includes a plurality of locations, and traveler information that comprises a plurality of unique traveler identifications and an associated plurality of stamps representative of at least one of a time and an associated location. The system also includes memory in communication with the processor, which stores instructions which are executed by the processor for retrieving traveler information for each of the plurality of locations in the associated database responsive to a location query including a selected location type (LType) from a predetermined set of location types, an analysis period (AP), and optionally a selected threshold acceptance ($Th_{pt}$). The instructions are also for determining, for each of the plurality of locations, a quantity (n) of stamps corresponding to the selected location type (LType), and determining, for each of the plurality of locations, a total number of stamps (T) during the analysis period (AP). In addition, the instructions are for computing, for each of the plurality of locations, a minimum quantity of stamps (H) to indicate the location is the selected location type (LType) as a function of the selected threshold acceptance ($Th_{pt}$) and the total number of stamps (T), and tagging locations of the plurality of locations in accordance with the selected location type (LType) when n reaches a threshold value which is a function of H.

In another aspect, a method for tagging a location type on an associated transportation system includes collecting, with a processor, traveler information comprising, for a plurality of travelers, at least one of a unique identification associated with the traveler, a first stamp, and at least one of a second stamp, a third stamp, and a fourth stamp. Each of the stamps includes an associated time and a corresponding location from a set of locations associated with the transportation system. The method further includes receiving a location query including a selected location type (LType), and an analysis period (AP), and retrieving collected traveler information in accordance with the received location query for each of a plurality of the locations. The method also includes determining, for each of the plurality of locations, a quantity (n) of at least one of the first stamps, second stamps, and fourth stamps stored in the associated database corresponding to the selected location type (LType), and determining, for each of the plurality of locations, a total number of stamps (T) during the selected analysis period (AP). In addition, the method includes computing, for each of the plurality of locations, a minimum quantity of stamps (H) to indicate the location is the selected location type (LType) as a function of a threshold acceptance ($Th_{pt}$) and the total number of stamps (T), and tagging locations of the plurality of locations in accordance with the selected location type (LType) when n reaches a threshold value which is a function of H.

DETAILED DESCRIPTION

One or more implementations of the subject application will now be described with reference to the attached drawings, wherein like reference numerals are used to refer to like elements throughout. Aspects of exemplary embodiments related to systems and methods for automatically tagging location type, automation of the interpretation of ticket validation sequences, and the like. In addition, example embodiments described herein provide for the collection and observation of traveler information in real-time so as provide information about recent usage of a public transportation network.

Figure 1:
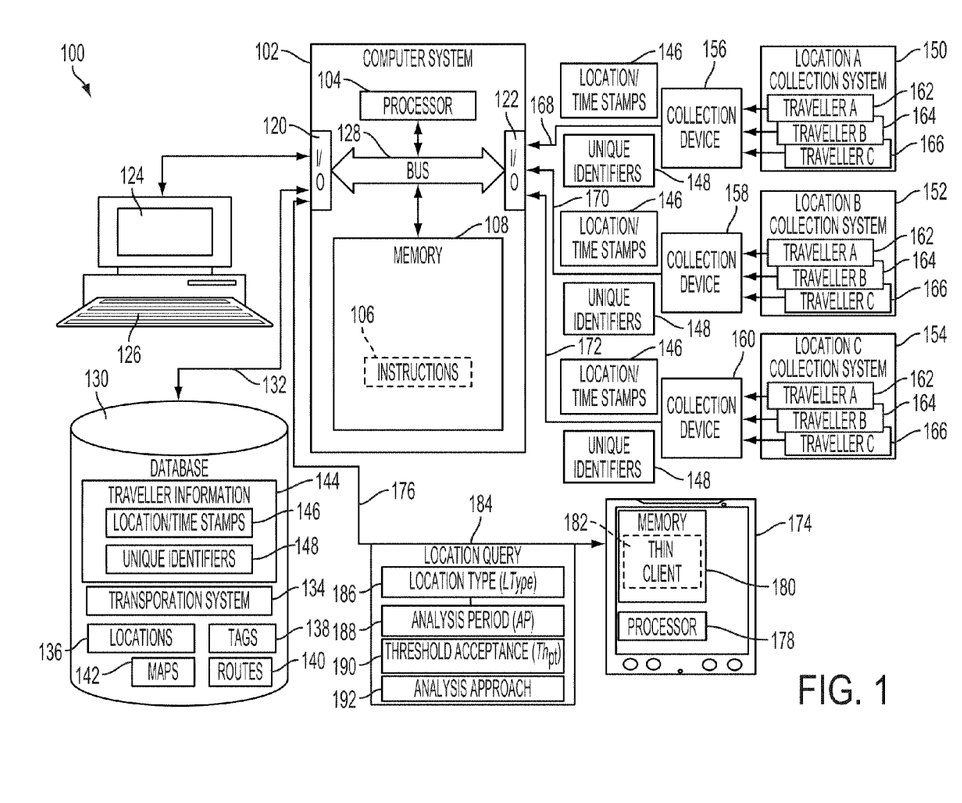
FIG. 1 diagrammatically shows a system for location type tagging using traveler data.

Referring now to FIG. 1, there is shown a location system 100 capable of tagging a location in a network of locations with a location type in accordance with one aspect of the exemplary embodiment. It will be appreciated that the various components depicted in FIG. 1 are for purposes of illustrating aspects of the exemplary embodiment, and that other similar components, implemented via hardware, software, or a combination thereof, are capable of being substituted therein.

It will be appreciated that the location system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network is comprised of physical layers and transport layers, as illustrated by the myriad of conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

As shown in FIG. 1, the location system 100 includes a computer system 102, which is capable of implementing the exemplary method described below. The computer system 102 may include a computer server, workstation, personal computer, combination thereof, or any other computing device.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102.

Computer system 102 also includes one or more interface devices 120, 122 for communicating with external devices. The I/O interface 120 may communicate with one or more of a display device 124, for displaying information to users, such as location-related data, and a user input device 126, such as a keyboard or touch or writable screen, for inputting text, and/or a cursor control device, such as mouse, trackball, or the like, for communicating user input information and command selections to the processor 104. The various components of the computer system 102 may be all connected by a data/control bus 128. The processor 104 of the computer system 102 is in communication with an associated database 130 via a link 132. A suitable communications link 132 may include, for example, the public switched telephone network, a proprietary communications network, infrared, optical, or any other suitable wired or wireless data transmission communications. The database 130 is capable of implementation on components of the computer system 102, e.g., stored in local memory 108, e.g., on hard drives, virtual drives, or the like, or on remote memory accessible to the computer system 102.

The computer system 102 may be a general or specific purpose computer, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single-core processor, a dual-core processor (or more generally by a multiple-core processor), a digital processor and cooperating math coprocessor, a digital controller, or the like. The digital processor 104, in addition to controlling the operation of the computer 102, executes instructions stored in memory 108 for performing the method outlined in FIG. 2 and FIGS. 3A-3B.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The associated database 130 corresponds to any organized collections of data (e.g., traveler information, routing information, user data, time data) used for one or more purposes. Implementation of the associated database 130 is capable of occurring on any mass storage device(s), for example, magnetic storage drives, a hard disk drive, optical storage devices, flash memory devices, or any suitable combination thereof.

In one embodiment, the network of locations is connected by transportation links and database 130 includes data corresponding to an associated transportation system 134, a collection of locations 136, tags 138, routes 140, maps 142 and traveler information 144. The traveler information 144 may correspond to ticket validation sequences and comprise, for example, a set of location/time stamps 146 and corresponding unique traveler identifications 148 associated with respective location/time stamps 146. For example, in the case of a public transportation system, the first database 130 includes information relating to the public transportation system 134 such as public transportation stops (or stations) 136, i.e., fixed locations that are linked by the transportation system, a set of location identifying tags (home, work, business, residential, etc.) 138 each tag being associable with one or more of the stops 136, public transportation routes (e.g., bus, subway, train, etc.) 140, maps 142 that pertain to the city, highways, transportation system 134, etc., and information 144 pertaining to travelers, such as each traveler's unique identification 148 (e.g., the information 144 may be derived from a smart card, a transit card, transit ticket, or the like, that cannot be rewritten or otherwise altered by the user (anti-counterfeiting properties)), and each location/time stamp 146 associated with that particular unique identification 148. Each location/time stamp 146 may include the time of entry of the traveler on the public transportation along with the corresponding location 136 or route 140 at which the traveler boarded, and the like. While each traveler on a public transport system is generally a person, travelers of other networked transportation systems may include goods or other inanimate objects.

Each location/time stamp 146 may include one or more of a route identifier e.g., a route number, a stop identifier, e.g., a stop number, an address, GPS coordinates, or other geographical identification information associated with the location. The time component of the stamp 146 may include one or more of a time of day, a day, a date, or other temporal information corresponding to the stamp. The time/location stamps 146 collected and used in the method may thus be ticketing data, collected via usage of prepaid cards, reloadable transit cards, or other ticketing devices. The tags 138 may reflect geographical designations, location types (e.g., work, home, commercial, etc.), user-defined labels, or the like. According to one embodiment, the tags 138 are linked to the locations 136. That is, each location 136 stored in the associated database 130 may be linked or "tagged" with a tag 138 so as to indicate the type of location. For example, a particular stop (location 136) on the route (140) of the associated transportation system 134 may correspond to a residential street area. The tag 138 associated with this location 136 may be a "home" or "residential" tag.

The traveler information 144 may be collected from a plurality of locations, illustrated in FIG. 1 as location A 150, location B 152, and location C 154. Each of the locations may correspond to a respective one of a finite set of locations connected by the transportation system. It will be appreciated that the collection of such information 144 may be performed by collection devices 156, 158, and 160 at each respective location 150-154, such as smart card readers, magnetic card readers, input terminals, ticket dispensers, ticket readers, and the like. Exemplary travelers 162, 164, and 166 on the transportation system use transportation cards, which are used to pay for or otherwise enable travel on the transportation system and thus are scanned, inserted in, or otherwise detected by the collection devices 156, 158, and 160 as the travelers travel through the transportation system from a first of the locations to a second of the locations. Such transportation cards may include smart card-like capabilities, e.g., microchip transmissions, magnetically stored data, and the like. In such embodiments, the devices 156-160 communicate location/time stamps 146 and corresponding unique identifiers 148 to the computer system 102 via respective links 168, 170, and 172. Suitable communications links 168, 170, and 172 may include, for example, the public switched telephone network, a proprietary communications network, infrared, optical, or any other suitable wired or wireless data transmission communications.

It will be appreciated that additional information may be collected by the collection devices 156-160 corresponding to ticketing operations including transportation usage data, ticketing receipt data, congestion data, and the like. Other methods for collecting traveler information 144 may alternatively or additionally be used, including, mobile communication events, e.g., time-stamped antenna authentication sequences or other observations of the intersecting of scheduled activities and traveler schedules.

The traveler information 144 associated with the implementation of FIG. 1 is for example purposes only. Other applications outside of the public transportation example are also contemplated. For example, toll-road monitoring and management systems may also take advantage of the subject systems and methods, whereby traveler information 144 is collected at toll-booths, upon entry and exit of a vehicle with respect to the associated toll road. Other embodiments, e.g., hospital monitoring of patient/employee entries and exits, secure facility monitoring, and the like, are also contemplated.

As illustrated in FIG. 1, the location system 100 may include or communicate with one or more user access devices 174, depicted in FIG. 1 as a tablet device that is capable of interacting with the computer system 102 via a suitable link 176. Device 174 is representative of any personal computing device, such as a personal computer, a netbook computer, a laptop computer, a workstation computer, a personal data assistant, a web-enabled cellular telephone, a smart phone, a proprietary network device, or other web-enabled electronic device. The data communications link 176 between the computer system 102 and the user access device 174 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

The user device 174 may include a processor 178, system memory 180, system, storage, buses that couple various system components including the system memory 180 to the processing unit 178, and the like. The user device 174 may be suitably configured to interact with the computer system 102, to access the database 130, submit location queries 184, receive search results, and the like. Specifically, the user device 174 may include a web-browser, dedicated application, or other thin client interface 182, e.g., stored in memory 180, which is operable to interact with the computer system 102. The thin client 180 may be suitably configured to display a graphical representation of the associated transportation system 134, mapped locations, e.g., locations 136, tags 138, and routes 140, overlaid on a suitable map 142 that may be stored on the database 130, retrieved from commercially available map databases, a combination thereof, or the like. Processor 178 and memory 180 can be configured as set forth above with respect to the processor 104 and memory 108 of the computer system 102.

In accordance with one embodiment, a user of the system 100, e.g., a person wishing to obtain information about the types of location for transportation planning purposes, may submit a location query 174 for processing by the computer system 102. The location query 174 may be submitted via the link 176 or directly input to system 102. The location query serves as a request for tagging of location types 186 for a selected grouping of locations 136 stored in the database 130. In such an embodiment, the location query 184 may include a location type (LType) 186, a desired analysis period (AP) 188, optionally, a selected threshold ($Th_{pt}$) 190, and a selected analysis approach 192, if more than one is available. The location type (LType) 186 is selected from a predetermined, finite set of at least two or at least three location types. The set of location types may include, for example, one or more location types referring to a work location, a home location, a business location, a residential location, a school location, commercial/industrial location, combination thereof or the like.

The analysis period (AP) 188 associated with the location query 184 may include one or more set times of day (i.e., span of hours, peak usage such as rush hours, lunch hours, morning commutes) a set of specific days, a number of days, a grouping of weeks, a grouping of business weeks, weekend days, months, or any other suitable temporal settings. For example, when tagging locations 136, the analysis period (AP) 188 may correspond to a specific set of days depending upon the country, e.g., Mon-Fri in the United States, Mon-Tues and Thurs-Fri in some European countries, Sun-Thurs in other countries, and the like. The analysis period (AP) 188 may be selected in accordance with any user-specified period of time, user-specified pattern of usage, or other commonly acknowledged periods of time, or selected from a set of preset time periods provided by the system.

The selected threshold ($Th_{pt}$) 190 may be expressed, for example, as a percentage or ratio of a total number (T) of stamps collected during the analysis period (AP), or any other suitable information from which this value can be determined, and may be selected by the user via the user access device 174. For example, the GUI may display a set of possible thresholds or a slider which allows the user to select a threshold within a predetermined range. The threshold ($Th_{pt}$) may correspond to a threshold error rate, a noise reduction (sensitivity) rate, a specificity rate, or other suitable threshold values.

The selected analysis approach 192 may be selected from a predetermined set of two or more analysis approaches which may be displayed on the GUI for selection by a user. One or more of the analysis approaches may be a default analysis approach which is automatically applied if the user does not make a selection. For example, the analysis approaches may include one or more of a time-based approach and a schedule-based approach. In the time-based approach, a simplified schedule of traveling is used, e.g., in a first predetermined time period, such as before noon, the traveler boards at a first of the predetermined set of locations (e.g., a Home location) and in a second, later predetermined time period (e.g., afternoon) the traveler boards at a second of the predetermined set of business locations (e.g., a place of business (Work). In the schedule-based approach, the order of the stops (movement) of a traveler is used to indicate the type of location, e.g., a first stamp may be inferred as a first of the predetermined set of locations (e.g., a Home location), and a second (or subsequent) stamp may be inferred as a second of the predetermined set of locations (e.g., could indicate a Work location). It will be appreciated that other scheduling, timing, or ordering approaches may be used in accordance with the systems and methods described herein. The location query 184 may be input by the user via access to the thin client 182 operable on the user device 174 in data communication with the computer system 102, via user interactions with the user input device 126 with results displayed on the display device 124, or the like.

Figure 2:
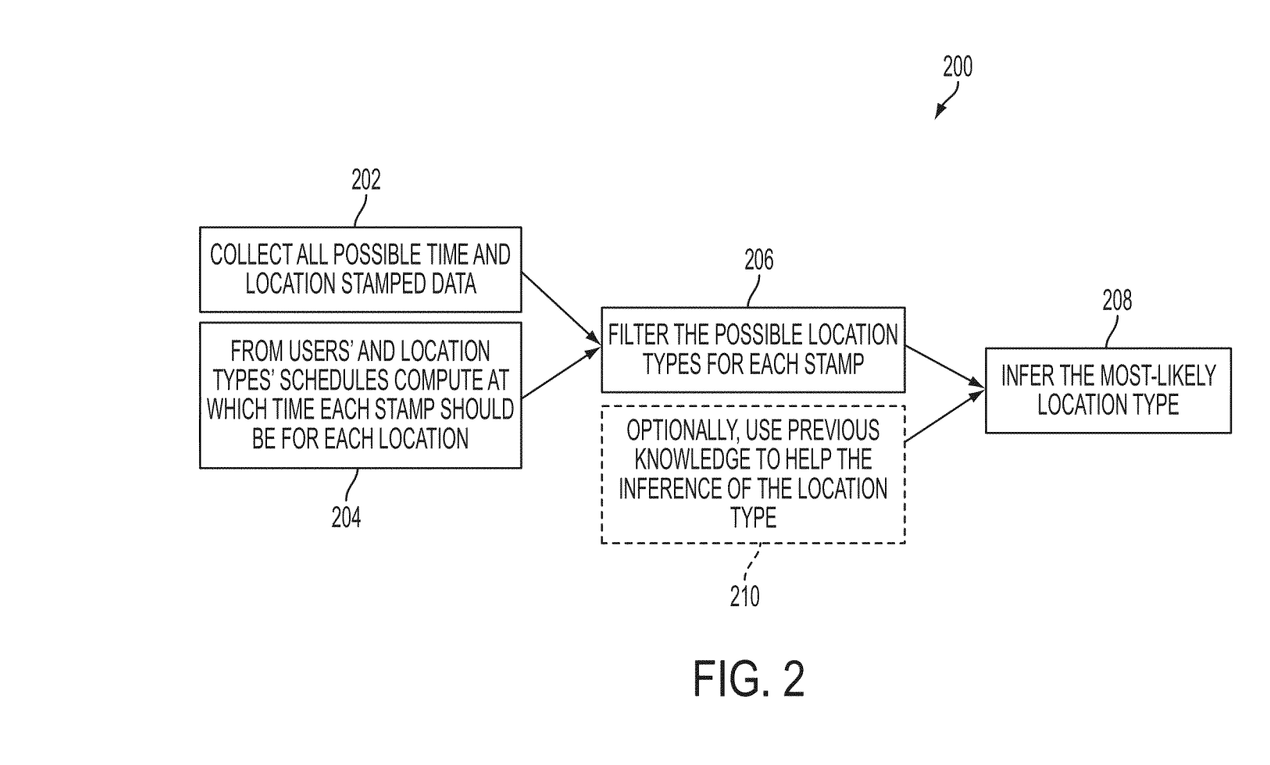
FIG. 2 is a flow chart which diagrammatically shows the operation of a method for location type tagging in accordance with one exemplary embodiment.

FIG. 2 provides an overview of the exemplary method 200. At 202, time and location data e.g., location/time stamps 146, is collected from all, or at least some, locations in the transportation system 134. From users' schedules and from location types' schedules, a computation may be performed at 204 to determine an appropriate time period, i.e., during which time period each stamp should be for each location, e.g., morning may be "Home" location types, afternoon may be "Work" location types, or the like. It will be appreciated that this computation may be an offline step that is performed partially manually. Filtering may then be performed at 206 to ascertain the possible location types for each stamp. An inference is made at 208 as to the most likely location type based upon the filtering at 206. Operations with respect to the filtering and inference made at 206 and 208 are explained in greater detail below from 312-326 and 336-362 of FIGS. 3A-3B. In accordance with one embodiment, previous knowledge may be used at 210 in conjunction with the filtering to assist in inferring the type of location. For example, previous knowledge may include manually entered location identification, survey response information, business registry information, taxation records, or the like.

Figure 3A:
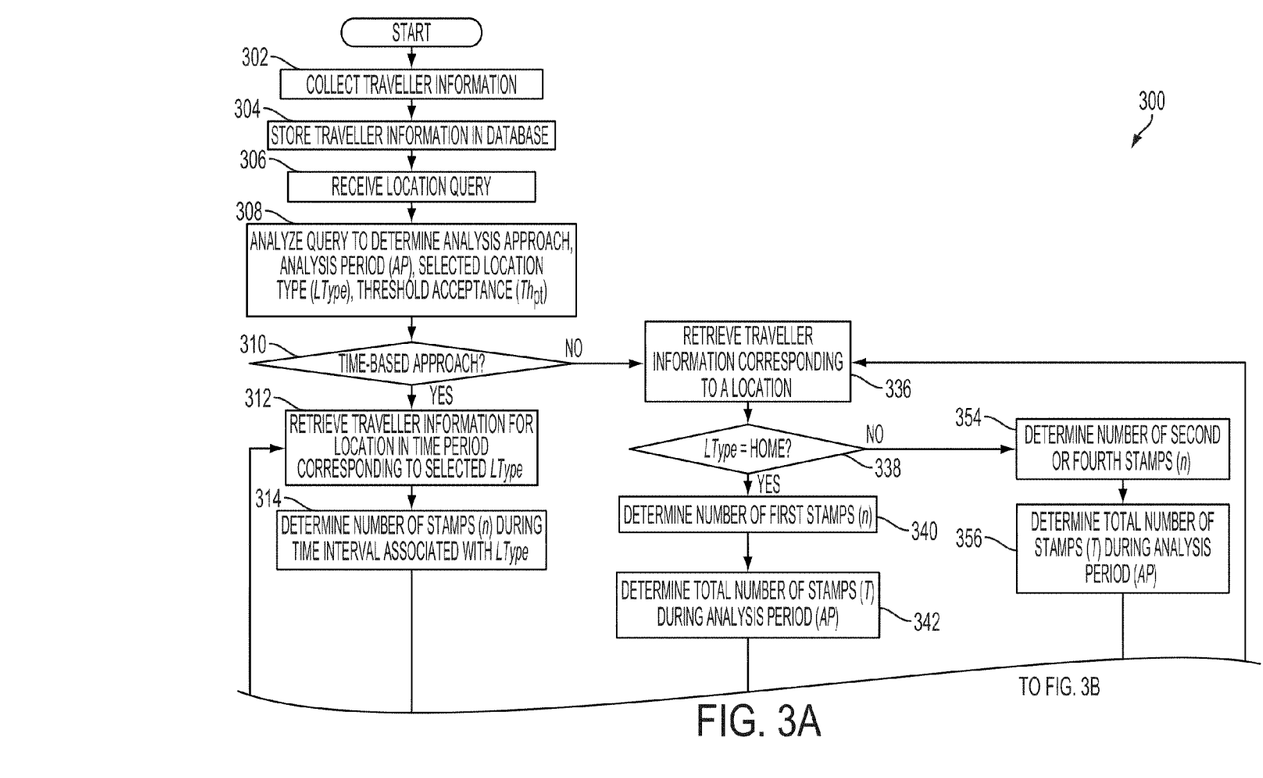
FIGS. 3A-3B illustrate a more detailed flow chart which diagrammatically shows the operation of the method for location type tagging shown in FIG. 2, in accordance with one example embodiment.
Figure 3B:
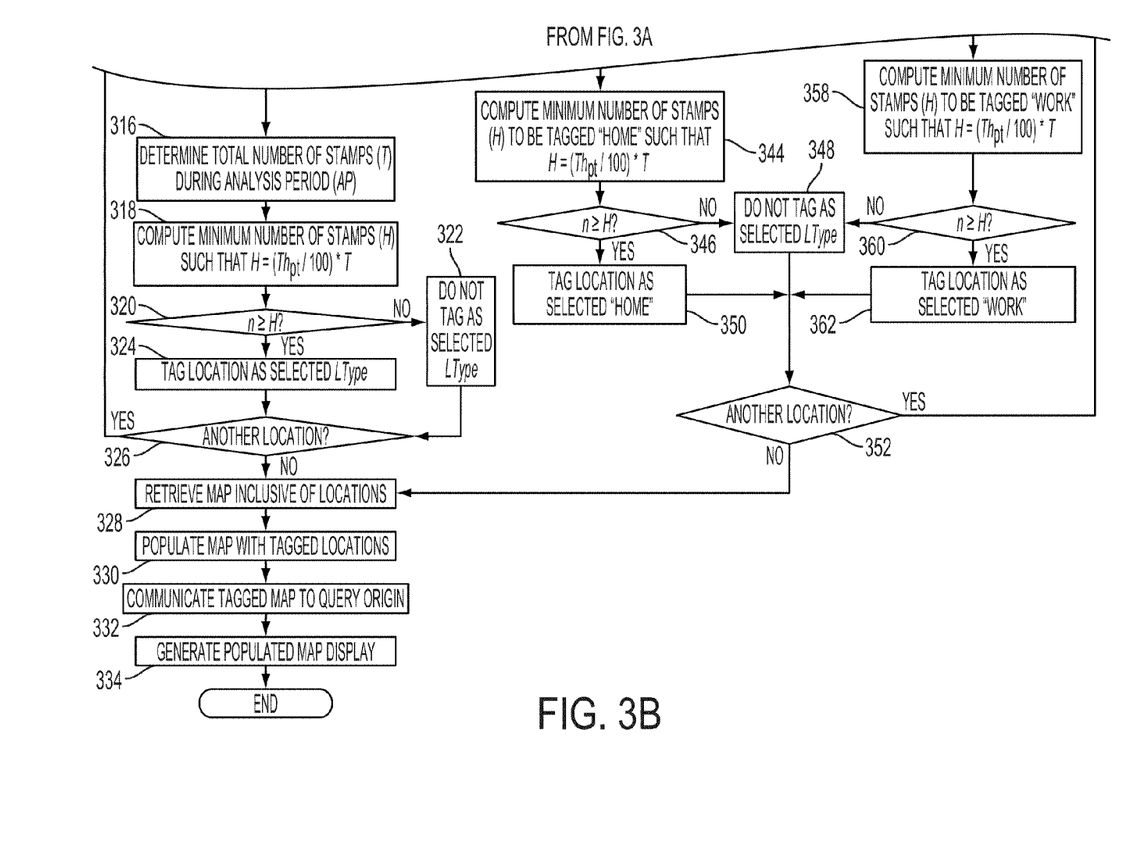

Turning now to FIGS. 3A-3B, there is illustrated a flowchart 300 depicting a more detailed illustration of one embodiment of the example method in accordance with one aspect of the exemplary embodiment. At 302, traveler information 144 is collected by the collection devices 156-160 from a plurality of travelers such as from at least 10, 20 or 100 travelers, generally with no limit on the number (travelers A (162), B (164), and C (166) in the illustrated embodiment) at each of a plurality of locations, such as at least 3 or at least 10 locations, e.g., up to 100 or 1000 locations (illustrated as location A 150, location B 152, and location C 154) in the example). In accordance with one embodiment, the traveler information 144 collected by the collection devices 156-160 from the travelers 162-166 includes location/time stamps 146, unique identifiers respectively associated with each traveler 162-166, and other associated data. In one embodiment, the collection devices 156-160 form components of the computer system 102 that are communicatively coupled to each location 150-154. In another embodiment, the collected traveler information 144 is communicated to the computer system 102 via links 168-172 from collection devices 156-160 proximally located with respect to the locations 150-154. It will be appreciated that the collection devices 156-160 may be stationary, i.e., located at the stops, or affixed to respective transporting devices, e.g., the carriage (bus, train, etc.) component of the transportation system 134. In some illustrative embodiments, the travelers 162-166 are carrying smart cards, near-field-communication enabled devices (e.g., personal data devices, cellular telephones, smartphones, etc.), cards magnetically storing identification and account information, cards with machine-readable data thereon (barcode, magnetic, etc.) or the ticketing components, which may be scanned, read, or otherwise communicated by/to the collection devices 156-160 for communication to the computer system 102 in accordance with the systems and methods set forth herein. It will be appreciated that with respect to the example implementation of FIGS. 3A-3B, the collected traveler information 144 corresponds to when/where the corresponding traveler 162-166 entered the system 134, with no knowledge of when or where the traveler 162-166 exited. Other embodiments, as discussed below, may include multiple instances of collection of traveler information 144 during the same travel, i.e., when the traveler 162-166 gets on and off the bus, tram, subway, or other component of the transportation system 134.

Figure 4:
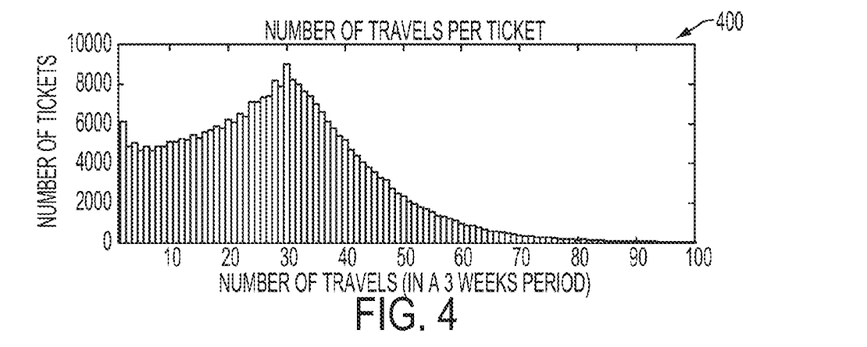
FIGS. 4-6 are graphical illustrations of traveler information usage in accordance with embodiments described herein.
Figure 5:
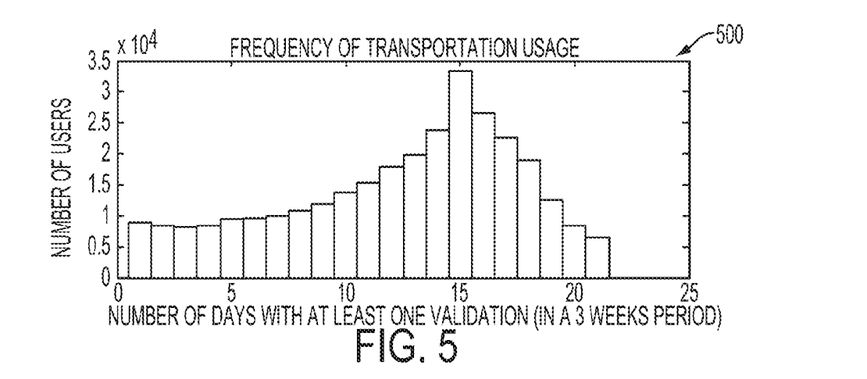
Figure 6:
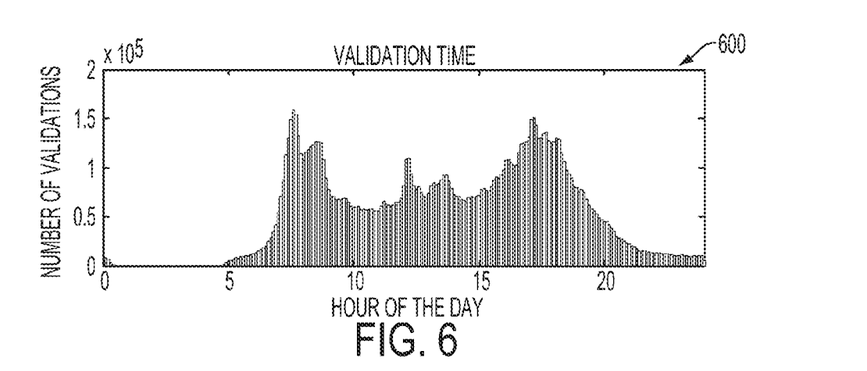

With reference also to FIGS. 4-6, there are shown graphs 400, 500 and 600 that reflect data collected in accordance with the systems 100 and method 300 described herein. Thus, FIG. 4 shows a graph 400 which illustrates a number of travels per ticket over a given period of time, i.e., the number of stamps 146 collected for each unique identification 148 over an analysis period (AP) 188 of three weeks for an entire location 136. The graph 500 in FIG. 5 illustrates the number of days during the three week period that included at least one validation (time stamp 146) for a unique identification 148. As shown, the transportation system 134 is typically used five days a week. The graph 600 in FIG. 6 illustrates the number of validations (time stamps 146) received and the corresponding time of the day at which such stamps 146 were received, thus indicating peak usage hours. It will be appreciated that the information displayed in FIGS. 4-6 is an example of the types of traveler information 144 collected in accordance with the subject application, as well as several usages by the system 100 and methods 200-300 thereof and which may be stored in any suitable type of data structure.

With continued reference to FIGS. 3A-3B, the collected traveler information 144 is then stored, at 304, in the database 130. According to one embodiment, the traveler information 144 includes, for example, time/location stamps 146, unique traveler identifiers 148, route information, transport information, and the like. The exemplary database 130 stores data and information relating to locations 136 (transportation stations or stops) of an associated transportation system 134, tags 138 (e.g., data related to tagging operations performed in accordance with the embodiments described herein), transportation routes 140, and the like. The tags 138 may also include, for example labels, rules, instructions, guidelines, time periods, or other specified indicia. It will be appreciated that the database 130 may include additional information relating to transportation systems, user information, and the like.

A location query 184 may be received at 206 from the user access device 174, the user input 126, or other suitable submission device at 206. According to one embodiment, the location query 184 is communicated from the user access device 174 via user interaction with the thin client interface 180 operative thereon. In one embodiment, the location query 184 includes, for example, a selected location type (LType) 186, an analysis period (AP) 188, a threshold acceptance ($Th_{pt}$) 190, and optionally a selected analysis approach 192. At 208, the processor 104 or other suitable component associated with the computer system 102 using instructions 106 stored in memory analyzes the received location query 184 so as to determine the selected location type (LType) 186, the selected analysis period (AP) 188, the selected threshold acceptance ($Th_{pt}$) 190, and the selected analysis approach 192, if any.

At 310, a determination is then made (e.g., by the processor 104 using instructions 106 stored in memory) whether a time-based approach has been selected. That is, a determination is made whether the user, via the location query 184 received from the user device 174 (or by default), has selected a time-based approach wherein the time associated with location/time stamps 146 is used for analysis, or a schedule-based approach that uses time/location stamps 146 and traveler scheduling for analysis. Upon a positive determination at 310, operations proceed to 312, where traveler information 144 for a first location from the database 130 in the time period corresponding to the selected LType 186 is retrieved. According to one example embodiment, the processor 104, using instructions 106, accesses the database 130 based upon the received query 184 so as to retrieve the traveler information 144 collected from a first location, e.g., location A 150, along a desired route 140, for the entire transportation system 134, or the like. It will be appreciated that the first retrieved location 150, 152, or 154 may be arbitrarily selected based on any of number of factors, e.g., user specified, distance from city center, initial stop on a route 140, or the like. It will further be appreciated that the retrieval of traveler information at 312 corresponds to the initiation of filtering and inference of 206 and 208 of FIG. 2, as referenced above. The method shown in FIGS. 3A-3B assumes that location types have already been associated with respective time periods, e.g., 204 of FIG. 2. An analysis period (AP) 192 generally includes multiple such time periods or portions thereof, e.g., over a course of a week, month, or the like.

At 314, the quantity, e.g., number (n) of time/location stamps 146 that correspond to the time interval associated with the selected LType 184 is determined. For example, the processor 104, using instructions 106, counts or otherwise ascertains the number of time/location stamps 146 that were collected at the first location (location A 150) in a first predetermined time period, such as before noon (e.g., when LType=Home) or in a second predetermined time period, such as after noon (e.g., when LType=Work). It will be appreciated that other time intervals may be implemented in addition to the Home/Work examples set forth above. For example, to ascertain an LType 186 of an evening leisure type location, such as an entertainment/restaurant/theater location, the subject system may determine those time/stamps collected on a specific day (e.g., Friday and Saturday) at a specific time (e.g., from 8 pm-3 am) may be indicative of late night travelers, which may be associated with the leisure type location(s). Other examples of time periods may pertain to daytime leisure locations, such as religious locations or sporting locations, such that Saturday or Sunday morning/afternoon stops may indicate the location of a church, temple, synagogue, mosque, stadium, field, arena, or the like.

At 316, the total number (T) of time/location stamps 146 that were collected during the analysis period (AP) 192 for location A 150 is determined. As noted above, the analysis period (AP) 192 may include a set time period, a set of specific days, a number of days, a grouping of weeks, a grouping of business weeks, weekend days, months, or any other suitable temporal settings. Thus, for example, the total number (T) of time/location stamps 146 that were collected during a selected number of days, weeks, only specific days, or the like, is determined from the stored traveler information 144 in the associated database 130. At 318, the processor 104 or other suitable component associated with the computer system 102 computes, calculates, or otherwise determines a minimum quantity, e.g., number (H) of stamps 146 that are to be tagged as the selected LType 186 based upon the selected threshold acceptance value ($Th_{pt}$) 190 submitted via the location query 184 and the total number (T). For example, the value of H may be computed based on a product of the two values, e.g., if $Th_{pt}$ is a percentage, according to: $H=(Th_{pt}/100)*T$. or if $Th_{pt}$ is a ratio, according to: $H=Th_{pt}*T$. in some embodiments, this value can be rounded, e.g., to the nearest integer value. For example, $Th_{pt}$ may be 30% or at least 50%.

At 320, a determination is then made as to whether a sufficient quantity, e.g., number (n) of stamps within a time interval corresponding to the selected location type have been received to render the tag reliable. In the exemplary embodiment, this related to the value of H, e.g., when n≥H (or when n≥H+1 or n≥98% H or the like). When n is not at the threshold, e.g., greater than or equal to H, for example, operations proceed to 322, whereupon the location 150 is not identified/tagged as the selected LType 186. Upon a determination at 320 that n is sufficiently reliable, e.g., greater than or equal to the computed H value, operations progress to 324, where the first location 150 is tagged as the selected LType 186. After tagging at 324 or non-tagging at 322, operations continue to 326. A determination is then made at 326 whether another location, e.g., location B 152 and/or location C 154, remains for analysis. Upon a positive determination at 326, operations return to 312, where traveler information 144 corresponding to the next location to be analyzed, e.g., location B 152, is retrieved from the database 130 that corresponds to the time interval associated with the selected LType 186. Operations then proceed from 312 through 326 as set forth above for each location 150-154 stored in the database 130, until a determination is made at 326 that no additional locations 150-154 remain to be processed. As will be appreciated, rather than considering each location independently and in turn, the method may simply pull data from the database in any order and assign it to the appropriate location.

Upon a determination at 326 that no additional locations 150-154 remain for analysis in the database 130, operations progress to 328. At 328, a map 142 (any suitable type of graphical representation) may be retrieved (e.g., by processor 104 using instructions 106). The map 142 includes at least the locations 150-154 of the transport system 134. According to one embodiment, the database 130 stores a plurality of maps 142 that correspond to the routes 140, tags 138, locations 136, transportation systems 134, and the like. In another embodiment, the maps 142 may be retrieved from commercially available sources, e.g., web-based resources, enabling the computer system 102 via a suitable communications link to retrieve such maps 142 for use at 328. In other embodiments, a map 142 may be generated automatically based on stored data (e.g., based on the stops and known links of the transportation network between them).

Figure 7:
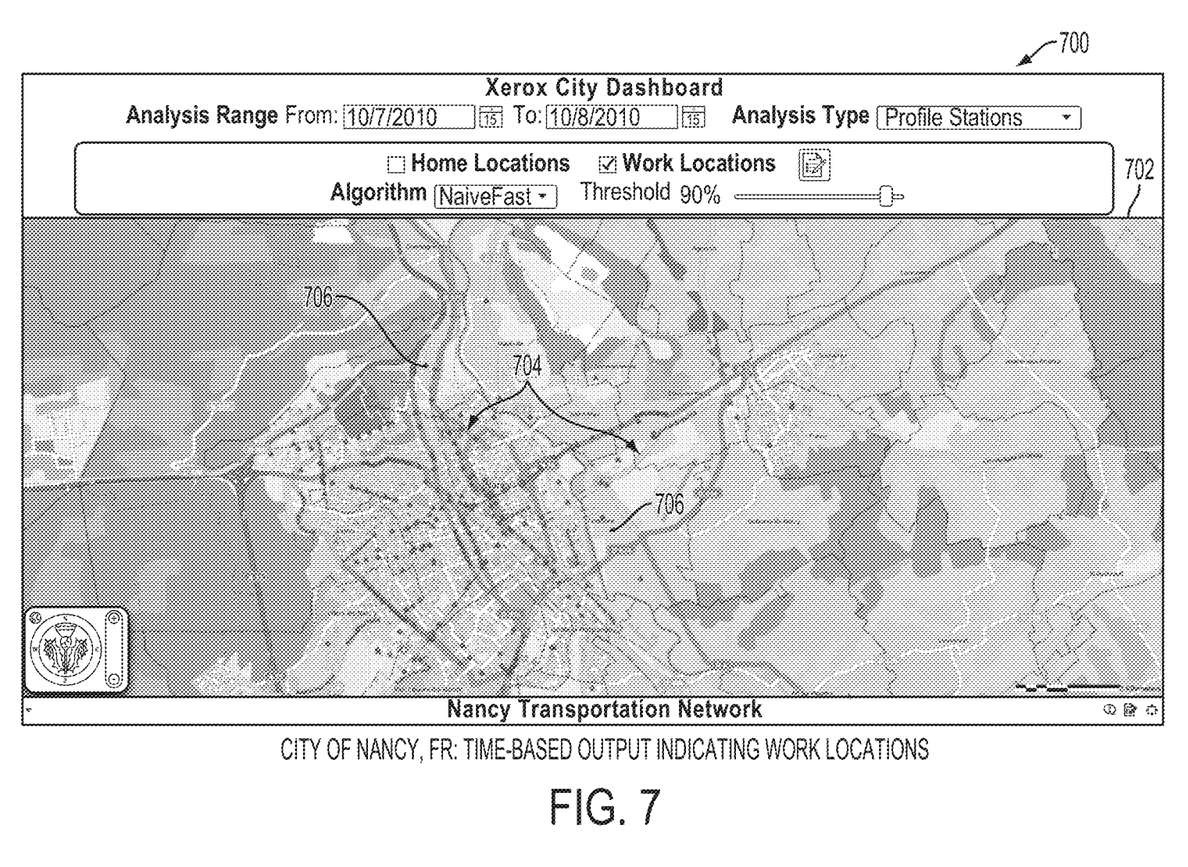
FIG. 7 illustrates an example output depicting tagged locations in accordance with the method of FIGS. 3A-3B.
Figure 8:
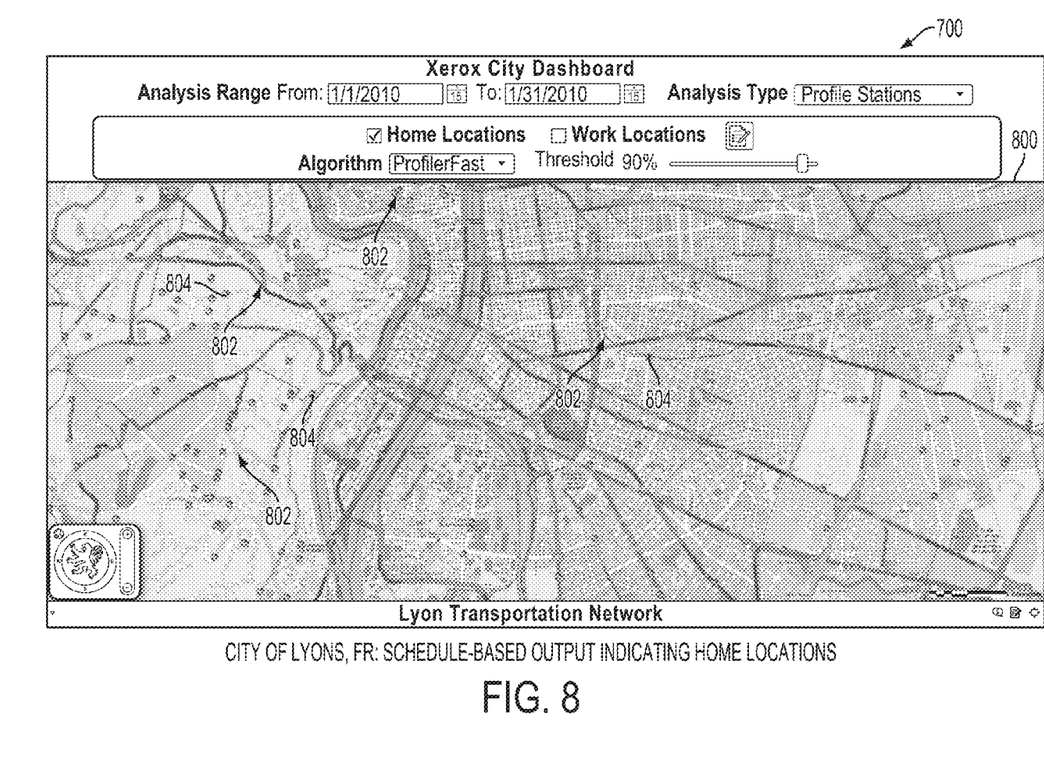
FIG. 8 illustrates an example output depicting tagged locations in accordance with the method of FIGS. 3A-3B.

At 330, the retrieved map 142 is populated with the location tags 138 previously determined at 320-324 (e.g., by processor 104 using instructions 106). At 332, the tagged map 142 is then communicated to a user, e.g., to the origin of the location query 184, e.g., the user access device 174. At 334, a populated map is generated via the display 124, the user device 174, or the like, such as is depicted in FIGS. 7 and/or 8 (discussed in greater detail below). It will be appreciated that the embodiments described herein may also provide data corresponding to peak usage of the transportation system 134 at particular times of day, days of the week, weeks of the month, months of the year, and the like. Stated another way, the system 100 and method 300 described in varying embodiments herein use ticketing data (i.e., collected traveler information 144) to automatically tag city locations based on predefined route patterns, e.g., schedules, stops, stamps, traveler identification, and the like.

It will be appreciated that the implementation of FIGS. 3A-3B may enable remote viewing of the tagged map 142, e.g., via the thin client 182, or may download the tagged map 142 directly to the memory 180 of the user device 174 responsive to the query 184. In another example embodiment, the tagged map 142 is stored on the database 130 for future retrieval and usage. According to one example embodiment, the processor 104 or other suitable component associated with the computer system 102 accesses a suitable third-party database (not shown) or performs a suitable search via the World-Wide Web for images or information associated with the locations 136 stored in the database 130, the locations A-C 150-154, wherein the tagged map 142 may also include one or more such images corresponding thereto.

FIG. 7 illustrates an example user interface 700 illustrating a map 702 (corresponding to the tagged map 142 referenced above) that depicts the transportation network 704 (representative of the transportation system 134 referenced above) of the city of Nancy, France. As shown in FIG. 7, the map 702 includes a plurality of tagged locations 706 indicating a "Work" LType 186 selected via the location query 184. According to one embodiment described herein, the time-based approach was selected, whereby those locations 150-154 having a sufficient number of stamps 146 during the time interval associated with the "Work" LType 186 are "tagged" on the map 702 using graphical indicators of a factory or business, i.e., indicated in FIG. 7 as the tagged locations 706. Stated another way, a location 150, 152, or 154 is tagged/identified as a particular LType 186 based upon the majority of stamps 146 collected during a predefined time interval (e.g., before noon, after noon, etc.). Thereafter, the map 702 is populated with the identified/tagged locations 706 via an associated user interface 700.

Returning to FIG. 3A, at 310, upon a determination that the time-based approach is not selected, operations progress to 336 for a schedule-based approach (or any other preselected approach from those which are predefined). The time-based approach assumes that a sequence of stamps 146 for the same traveler with a preselected time period (typically collected on the same day, e.g., with a 24 hour time period) are indicative of different journeys, since only one stamp is received for each journey in the exemplary embodiment. At 336, traveler information 144 from the database 130 corresponding to a first location, e.g., location A 150 is retrieved (e.g., by processor 104 with instructions 106). A determination is then made at 336 whether the selected location type (LType) is a first type, e.g., a "Home" location. Upon a positive determination at 338, operations proceed to 340, whereupon the number (n) of first stamps 146 collected for location A 150 are determined. It will be appreciated that the typical traveler 162-166, using the transportation network 134, generally boards public transit at or near their place of residence. Thus, the first time/location stamp 146 collected from each traveler 162-166 in a day will generally indicate they boarded at or near a residential address. Accordingly, when LType is set as "Home", the first time/location stamp 146 associated with each unique identifier 148 for location A 150 are retrieved from the collected traveler information 144 on the database 130.

At 342, the total number (T) of time/location stamps 146 collected from location A 150 during the selected analysis period (AP) 188 is determined (e.g., by processor 104 with instructions 106). As previously discussed, the analysis period (AP) 192 may correspond to a selected set of days, weeks, only specific days, months, or the like. Accordingly, the total number (T) of time/location stamps 146 collected during the selected set of days, weeks, on specific days, months, etc., for location A 150 is determined from the traveler information 144 stored on the associated database 130. At 344, a minimum number (H) of time/location stamps 146 that are to be tagged as "Home" (i.e., in accordance with the selected LType 186), is computed based upon the selected threshold acceptance value ($Th_{pt}$) 190 submitted via the location query 184, e.g., such that $H=(Th_{pt}/100)*T$, or otherwise as discussed for 318.

A determination is then made at 346 whether n is sufficient, as for 320, e.g., greater than or equal to H ($n \geq H$). When n is not equal to or greater than the threshold, e.g., H, operations proceed to 348, whereupon location A 150 is not identified/tagged as the "Home" LType 186. Upon a determination at 346 that n is greater than or equal to the computed H value, operations progress to 350, whereupon location A 150 is tagged as the selected "Home" LType 186. After non-tagging at 348 or tagging at 350, operations progress to 352, whereupon a determination is made whether another location, e.g., location B 152 and/or location C 154, remain for analysis. When additional locations 152 and 154 remain for analysis, operations return to 336, whereupon traveler information 144 corresponding to the next location, e.g., location B 152, is retrieved from the database 130. Operations then proceed from 336 through 352 as set forth above for each location 150-154 stored in the database 130, until a determination is made at 352 that no additional locations 150-154 remain. It will be appreciated that the determination at 338 need not be repeated, as such determination may only need to be performed once for each received location query 184. When it is determined at 352 that no additional locations 150-154 remain for analysis in the database 130, operations proceed to 330 in accordance with the discussion of operations set forth above.

FIG. 8 illustrates the example user interface 700 illustrating a map 800 (corresponding to the tagged map 142 referenced above) that depicts the transportation network 802 (representative of the transportation system 134 referenced above) of the city of Lyons, France. As shown in FIG. 8, the map 800 includes a plurality of tagged locations 804 indicating a "Home" LType 186 selected via the location query 184. According to one embodiment described herein, the schedule-based approach was selected, whereby those locations 150-154 having a sufficient number of stamps 146 associated with the "Home" LType 186 (first stamps) are "tagged" on the map 800 using graphical indicators of a house or other such residence, i.e., indicated in FIG. 8 as the tagged locations 804. Stated another way, a location 150, 152, or 154 is tagged/identified as a "Home" LType 186 based upon the number of first stamps 146 collected at that location 150, 152, or 154. Thereafter, the map 800 is populated with the identified/tagged locations 804 via the associated user interface 700.

Returning to FIG. 3A, 338, when it is determined that the selected LType 186 of the received location query 184 does not indicate a "Home" location type, i.e., it is a "Work" location type being requested, operations proceed to 354. At 354, the number (n) of second or fourth time/stamps 146 from the traveler information 144 corresponding to each unique identifier 148 with respect to the location, e.g., location A 150, being analyzed is determined (e.g., by processor 104 with instructions 106). It will be appreciated that the example embodiment 300 of FIGS. 3A-3B may utilize either the second time/location stamps 146 or the fourth time/location stamps 146 in the determination of the location type (LType) 186 associated with a particular location 150-154. For example, the traveler 162-166 generally joins the transportation system 134 from his or her residence as the first stamp 146 collected. The second stamp 146 is indicative of a place of business, which may result from the traveler 162-166 using the transportation system 134 at midday for lunch, meetings, or the like. A third stamp 146 collected from the traveler 162-166 may indicate a restaurant, another business, a residence, or the like, and as such may be discounted as not being indicative enough of one type of location. Thereafter, a fourth stamp 146 that may be collected, i.e., the fourth time that a traveler 162-166 makes use of the transportation system 134, typically indicates the traveler 162-166 leaving his or her employment for the evening. It will be understood that in some instances, a traveler 162-166 may only provide two stamps 146 during a given period of time, thus the usage of only the second time stamp 146 for location type determination is contemplated in one embodiment.

At 356, the processor 104 or other suitable component associated with the computer system 102 determines a total number (T) of time/location stamps 146 collected from location A 150 during the selected analysis period (AP) 188, e.g., stamps 146 collected during a selected set of days, weeks, only specific days, months, or the like. As previously addressed, the total number (T) of time/location stamps 146 collected during the analysis period (AP) 188 is determined from the traveler information 144 stored on the associated database 130. At 358, a minimum number (H) of time/location stamps 146 that are to be tagged as "Work" (i.e., as indicated in the location query 184), is computed based upon the selected threshold acceptance value ($Th_{pt}$) 190 submitted via the location query 184 as a function, e.g., such that $H=(Th_{pt}/100)*T$, or otherwise, as discussed for 318

At 360, a determination is made as to whether n is greater than or equal to H, or otherwise, as discussed for 320. Upon a determination at 360 that n is not greater than or equal to H, operations proceed to 348, whereupon location A 150 is not identified/tagged as the selected LType 186, i.e., a "Work" location type. When it is determined at 360 that n is greater than or equal to the computed H value, location A 150 is tagged as a "Work" location type (the selected LType 186 of the location query 184). After non-tagging at 348 or tagging at 362, operations proceed to 352, for a determination of whether any additional locations 152-154 remain for analysis in accordance with the received location query 184. When additional locations remain for analysis, e.g., location B 152 and/or location C 154, operations return to 336, whereupon traveler information 144 corresponding to the next location, e.g., location B 152, is retrieved from the database 130.

Operations then proceed from 336 through 352 as set forth above for each location 150-154 stored in the database 130, until a determination is made at 352 that no additional locations remain. As discussed above, it will be appreciated that 338 need not be repeated after the first such determination, thus, after returning to 336, operations proceed to 354 so as to continue analyzing the stored traveler information 144 for the additional locations 152-154 in accordance with the location query 184. When it is determined at 352 that no additional locations remain for analysis in the database 130, operations proceed to 330 in accordance with the discussion of operations set forth above. It will be appreciated that if the selected LType 186 had been a "Work" location type 186, the locations 150, 152, or 154 would be tagged as "Work" based upon the number of second or fourth stamps 146 collected at the location 150, 152, or 154 in FIG. 7 in the manner discussed above with respect to the Home LType 186.

It will be appreciated that the example implementations described with respect to FIGS. 2 and 3 indicates a single ticket validation during travel on the transportation system 134, i.e., the traveler 162-166 only receives a single stamp 146 upon entering the transportation system 134, thus only the entry point is being evaluated in the method. It will be understood that in other embodiments, a time/location stamp 146 may be generated twice during travel, e.g., one stamp 146 upon entering the transportation system 134 and another stamp 146 upon exiting the system 134, or when changing from one route to another. In such an embodiment, the total number of stamps 146 attributable to a traveler 162-166 may increase during a designated time period. Accordingly, the determinations discussed above associating certain stamps with location types 186 may be suitably modified without departing from the systems and methods described herein. For example, stamps 146 collected may be further distinguished on whether they are an entrance stamp or an exit stamp, which information may be used in ascertaining location type in accordance with the collection time associated with such a stamp 146. In another example wherein two stamps 146 are acquired for each trip, the first and sixth stamps 146 may indicate a "Home" location type 186, while the second, third, and fifth stamps 146 represent a "Work" location type 186, or variations thereon.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the exemplary retrieval method.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for tagging a location type, the method comprising:
with a computer processor, collecting traveler information comprising at least one of a unique traveler identification and at least two or more stamp representative of a time and an associated location into an associated database;
receiving a location query including a selected location type, an analysis period, and a selected threshold acceptance, wherein the selected threshold acceptance is representative of at least one of a percentage or a ratio of a total number of stamps during the analysis period;
determining, for each of a plurality of locations, a quantity of stamps within a time interval corresponding to the selected location type, wherein each of the plurality of locations corresponds to a stop on an associated transportation system;
determining, for each of the plurality of locations, total number of stamps during the analysis period;
computing, for each of the plurality of locations, a minimum quantity of stamps to indicate the location is the selected location type as a function of the selected threshold acceptance and the total number of stamps during the analysis period;
tagging locations of the plurality of locations in accordance with the selected location type based on the quantity of stamps within the time interval corresponding to the selected location type and the minimum quantity of stamps to indicate the location is the selected location type;
retrieving map information geographically representative of the associated transportation system;
populating a map corresponding to the retrieved map information with the each tagged location; and
generating a representation of the populated map for display to a user on an associated user interface.

2. The method of claim 1, wherein the collecting traveler information further comprises collecting a plurality of a first stamp, a second stamp, a third stamp, and a fourth stamp associated with each unique identification.

3. The method of claim 2, wherein the determining of the quantity of stamps further comprises determining, for each of the plurality of locations, a number of at least one of the first stamps, the second stamps, and the fourth stamps in accordance with the selected location type.

4. The method of claim 3, wherein a first stamp corresponds to a home location type and the second and fourth stamp correspond to a work location type.

5. The method of claim 1, wherein the location type is selected from the group consisting of a home location and a work location.

6. The method of claim 5, wherein the time interval corresponding to the selected location type is before an established time for a home location and after the established time for a work location.

7. The method of claim 1, wherein the analysis period is at least one of a number of days, a number of weeks, a number of months, a number of business days, a number of weekend days, and a specific grouping of days.

8. The method of claim 1, wherein the minimum quantity of stamps is based on a product of the threshold acceptance and the total number of stamps.

9. The method of claim 1, further comprising providing a link between the computer and a user access device for receiving the location query.

10. The method of claim 1, wherein the location query further comprises a user-selected analysis approach, which is selected from a finite set of analysis approaches and the method further comprises computing the minimum quantity in accordance with the selected analysis type.

11. The method of claim 10, wherein the set of analysis approaches comprises a time-based approach in which it is assumed that travelers initiate travel at a first location type of a predetermined set of the location types in a first predetermined time period and initiate travel at a second location type of the predetermined set of the location types in a second predetermined time period.

12. The method of claim 10, wherein the set of analysis approaches comprises a schedule-based approach, wherein an order of the stamps of a traveler within a preselected time period are used to infer a type of location, an earlier stamp being used to infer a first location type of a predetermined set of the location types and a later of the stamps being used to infer a second location type of a predetermined set of the location types.

13. The method of claim 1, wherein the user-selected location type is selected from a predetermined set of location types.

14. The method of claim 1, wherein the tagging each of the plurality of locations occurs when the quantity of stamps within the time interval corresponding to the selected location type is at least the minimum quantity of stamps to indicate the location is the selected location type.

15. The method of claim 1, further comprising automatically tagging a set of the locations based on predefined route patterns extracted from the traveler information.

16. The method of claim 1, wherein the tagging of each of the plurality of locations in accordance with the selected location type is further based on prior knowledge.

17. A system for tagging a location type comprising memory which stores instructions for performing the method of claim 1 and a processor in communication with the memory for executing the instructions.

18. A computer program product comprising a non-transitory recording medium storing instructions, which when executed on a computer causes the computer to perform the method of claim 1.

19. A system for tagging a location type, the system comprising:
- a processor with access to associated memory, the associated memory storing an associated database comprising a plurality of locations and traveler information comprising a plurality of unique traveler identifications, and an associated plurality of stamps representative of a time and an associated location; and
- memory in communication with the processor, which stores instructions which are executed by the processor for:
  - retrieving traveler information for each of the plurality of locations in the associated database responsive to a location query including a selected location type from a predetermined set of location types, an analysis period, and a selected threshold acceptance, wherein each of the plurality of locations corresponds to a stop on an associated transportation system, and wherein the selected threshold acceptance is representative of at least one of a percentage or a ratio of a total number of stamps during the analysis period,
  - determining, for each of the plurality of locations, a quantity of stamps corresponding to the selected location type,
  - determining, for each of the plurality of locations, a total number of stamps during the analysis period,
  - computing, for each of the plurality of locations, a minimum quantity of stamps to indicate the location is the selected location type as a function of the selected threshold acceptance and the total number of stamps,
  - tagging locations of the plurality of locations in accordance with the selected location type when the quantity of stamps within the time interval corresponding to the selected location type reaches a threshold value which is a function of the minimum quantity of stamps,
  - retrieving map information geographically representative of an associated public transportation system,
  - populating a map corresponding to the retrieved map information with the each tagged location, and
  - generating a representation of the populated map for display to a user on an associated user interface.

20. The system of claim 19, wherein the analysis period is at least one of a number of days, a number of weeks, a number of months, a number of business days, a number of weekend days, and a specific grouping of days.

21. A method for tagging a location type on an associated transportation system, the method comprising:
- with a computer processor, collecting traveler information comprising, for each a plurality of travelers, at least one of a unique identification associated with the traveler, a first stamp, and at least one of a second stamp, a third stamp, and a fourth stamp, each stamp including an associated time and a corresponding location from a set of locations associated with the transportation system;
- receiving a location query including a selected location type, and an analysis period;
- retrieving collected traveler information in accordance with the received location query for each of a plurality of the locations, wherein each of the plurality of locations corresponds to a stop on an associated transportation system;
- determining, for each of the plurality of locations, a quantity of at least one of the first stamps, second stamps, and fourth stamps stored in the associated database corresponding to the selected location type;
- determining, for each of the plurality of locations, a total number of stamps during the selected analysis period;
- computing, for each of the plurality of locations, a minimum quantity of stamps to indicate the location is the selected location type as a function of a threshold acceptance and the total number of stamps during the analysis period, the threshold acceptance selected from the group consisting of an error rate, a noise reduction rate, or a specificity rate;
- tagging locations in the plurality of locations in accordance with the selected location type based on the quantity of stamps corresponding to the selected location type and the minimum quantity of stamps to indicate the location is the selected location type;
- retrieving map information geographically representative of the associated public transportation system;
- populating a map corresponding to the retrieved map information with the each tagged location; and
- generating a representation of the populated map for display to a user on an associated user interface.

* * * * *